United States Patent
Subramanian et al.

(10) Patent No.: US 7,549,840 B2
(45) Date of Patent: **\*Jun. 23, 2009**

(54) THROUGH THICKNESS REINFORCEMENT OF SIC/SIC CMC'S THROUGH IN-SITU MATRIX PLUGS MANUFACTURED USING FUGITIVE FIBERS

(75) Inventors: Suresh Subramanian, Mason, OH (US); James Dale Steibel, Mason, OH (US); Douglas Melton Carper, Trenton, OH (US)

(73) Assignee: General Electric Company, Schenectady, NY (US)

( * ) Notice: Subject to any disclaimer, the term of this patent is extended or adjusted under 35 U.S.C. 154(b) by 725 days.

This patent is subject to a terminal disclaimer.

(21) Appl. No.: 11/155,786

(22) Filed: Jun. 17, 2005

(65) Prior Publication Data

US 2006/0283014 A1    Dec. 21, 2006

(51) Int. Cl.
*F01D 9/02*    (2006.01)
*F01D 5/12*    (2006.01)
*F01D 25/12*   (2006.01)

(52) U.S. Cl. .................. 415/173.1; 29/889.2; 415/200; 415/115; 416/96 R; 416/230; 416/229 A; 416/241 B

(58) Field of Classification Search ............. 29/889.2; 415/173.1, 115; 416/230, 229 A, 241 B, 416/96 R; 428/34.6, 166, 188; 264/41, 45.1, 264/605, 241, 257
See application file for complete search history.

(56) References Cited

U.S. PATENT DOCUMENTS

| 3,533,813 | A | 10/1970 | Geltman |
| --- | --- | --- | --- |
| 4,725,567 | A | 2/1988 | Hillig |
| 4,810,442 | A | 3/1989 | Hillig et al. |
| 4,981,822 | A | 1/1991 | Singh et al. |
| 5,043,303 | A | 8/1991 | Singh et al. |
| 5,067,998 | A | 11/1991 | Singh et al. |
| 5,160,676 | A | 11/1992 | Singh et al. |
| 5,250,243 | A | 10/1993 | Allaire et al. |
| 5,387,299 | A | 2/1995 | Singh et al. |
| 5,389,321 | A | 2/1995 | Bansal |

(Continued)

FOREIGN PATENT DOCUMENTS

EP    0 317 129 A1    5/1989

(Continued)

*Primary Examiner*—Ninh H Nguyen
(74) *Attorney, Agent, or Firm*—McNees Wallace & Nurick, LLC

(57) ABSTRACT

A method of manufacturing a turbine engine component comprising the steps of providing and laying up a plurality of ceramic plies comprising woven ceramic fiber tows to form a turbine engine component shape, inserting a plurality of tows of oxidizable fugitive fibers into the component shape, such that each fugitive fiber tow passes through a preselected number of ceramic plies, burning off the fugitive fiber tows, the burning producing through-thickness void regions, rigidizing the component shape with a layer of BN and a layer of SiC to form a coated component preform using chemical vapor infiltration, and partially densifying the coated component preform using carbon-containing slurry and filling the through thickness void regions, and further densifying the coated component preform with at least silicon to form a ceramic matrix composite turbine engine component with in-situ ceramic matrix plugs formed where the through-thickness void regions were located.

20 Claims, 5 Drawing Sheets

U.S. PATENT DOCUMENTS

| | | |
|---|---|---|
| 5,407,740 A | 4/1995 | Jessen |
| 5,488,017 A | 1/1996 | Szweda et al. |
| 5,654,246 A | 8/1997 | Newkirk et al. |
| 5,858,513 A | 1/1999 | Jessen |
| 5,866,244 A | 2/1999 | Jessen |
| 6,030,698 A | 2/2000 | Burchell et al. |
| 6,103,337 A | 8/2000 | Burgess |
| 6,254,975 B1 | 7/2001 | Kayser et al. |
| 6,258,737 B1 * | 7/2001 | Steibel et al. ............... 442/172 |
| 6,280,550 B1 | 8/2001 | Steibel et al. |
| 6,291,057 B1 | 9/2001 | Fujita |
| 6,309,994 B1 | 10/2001 | Marra et al. |
| 6,316,083 B1 | 11/2001 | Kawabata et al. |
| 6,447,893 B2 | 9/2002 | Hanzawa et al. |
| 6,555,211 B2 | 4/2003 | Moody |
| 6,746,755 B2 * | 6/2004 | Morrison et al. ............ 428/166 |
| 7,153,464 B2 * | 12/2006 | Millard et al. .............. 264/317 |
| 2002/0076541 A1 | 6/2002 | Jarmon et al. |
| 2004/0115348 A1 * | 6/2004 | Landini et al. ......... 427/249.15 |
| 2006/0147688 A1 * | 7/2006 | Subramanian et al. ... 428/292.1 |

FOREIGN PATENT DOCUMENTS

| | | |
|---|---|---|
| EP | 0 825 163 A1 | 2/1998 |
| EP | 0 926 111 A2 | 6/1999 |
| EP | 1 028 097 A2 | 8/2000 |
| EP | 1 028 099 A1 | 8/2000 |
| JP | 4-160059 | 3/1992 |
| WO | WO 87/04659 | 8/1987 |
| WO | WO 01/98566 A1 | 12/2001 |
| WO | WO 02/26658 A1 | 4/2002 |

* cited by examiner

THROUGH THICKNESS REINFORCEMENT OF SIC/SIC CMC'S THROUGH IN-SITU MATRIX PLUGS MANUFACTURED USING FUGITIVE FIBERS

STATEMENT REGARDING FEDERALLY SPONSORED RESEARCH OR DEVELOPMENT

The United States Government retains license rights in this invention and the right in limited circumstances to require the patent owner to license others on reasonable terms by the terms of Government Contract No. N00421-00-3-0536 awarded by the Department of the Navy.

RELATED APPLICATIONS

This Application is related to application Ser. No. 11/155,190, filed on even date with this Application, entitled "INTERLAMINAR TENSILE REINFORCEMENT OF SiC/SiC CMC's USING FUGITIVE FIBERS" which is also assigned to the assignee of the present invention and which is hereby incorporated by reference in its entirety

FIELD OF THE INVENTION

The present invention relates generally to ceramic matrix turbine engine components, and more particularly, to a method of manufacturing ceramic matrix composite turbine blade.

BACKGROUND OF THE INVENTION

In order to increase the efficiency and the performance of gas turbine engines so as to provide increased thrust-to-weight ratios, lower emissions and improved specific fuel consumption, engine turbines are tasked to operate at higher temperatures. As the higher temperatures reach and surpass the limits of the material comprising the components in the hot section of the engine, and in particular, the turbine section of the engine, new materials must be developed.

As the engine operating temperatures have increased, new methods of cooling the high temperature alloys comprising the combustors and the turbine airfoils have been developed. For example, ceramic thermal barrier coatings (TBCs) were applied to the surfaces of components in the stream of the hot effluent gases of combustion to reduce the heat transfer rate and to provide thermal protection to the underlying metal and allow the component to withstand higher temperatures. These improvements helped to reduce the peak temperatures and thermal gradients. Cooling holes were also introduced to provide film cooling to improve thermal capability or protection. Simultaneously, ceramic matrix composites were developed as substitutes for the high temperature alloys. The ceramic matrix composites (CMCs) in many cases provided an improved temperature and density advantage over the metals, making them the material of choice when higher operating temperatures were desired.

A number of techniques have been used in the past to manufacture turbine engine components, such as turbine blades using SiC/SiC ceramic matrix composites (CMC) formed from 2-D ceramic fiber plies. However, such materials have inherently low intralaminar properties. The primary cause of the low intralaminar strength is the presence of a Boron Nitride (BN) layer that is typically included between the fiber and the ceramic matrix to increase fracture toughness. In many of the hot section applications, such as combustor liners, high pressure turbine blades, high pressure turbine vanes, low pressure turbine blades and low pressure turbine vanes, the thermal gradients and mechanical loads that result from normal engine operation result in significant local interlaminar stresses. Ideally, the CMC component would be designed such that the component had enhanced interlaminar strength in local high stress areas of many of these applications.

One technique of manufacturing CMC turbine blades is the method known as the slurry cast melt infiltration (MI) process. A technical description of a slurry cast MI method is described in detail in U.S. Pat. No. 6,280,550 B1, which is assigned to the assignee of the present invention and which is incorporated herein by reference. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. By "silicon carbide-containing fiber" is meant a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide. These examples are given for demonstration of the term "silicon carbide-containing fiber" and are not limited to this specific combination. Other fiber compositions are contemplated, so long as they include silicon carbide.

A major challenge in this approach is the low interlaminar strength between the plies of the woven ceramic fibers. The low interlaminar strength diminishes the ability of the CMC component to endure significant local interlaminar stresses.

One approach to solve the problem of low interlaminar strength in CMC's has been the use of through thickness fiber reinforcement. Approaches known in the art as T-forming and Z-pinning have been used to introduce load carrying fibers in the through thickness direction of CMC fiber plies at an angle to the plane of the plies to enhance interlaminar strength and are well-known in the art. The T-forming technology is described in U.S. Pat. No. 6,103,337, entitled "FIBER-REINFORCED COMPOSITE MATERIALS STRUCTURES AND METHODS OF MAKING SAME", assigned to Albany International Techniweave, Inc., issued Aug. 15, 2000, and in U.S. Pat. No. 6,555,211 B2, entitled "CARBON COMPOSITES WITH SILICON BASED RESIN TO INHIBIT OXIDATION", assigned to Albany International Techniweave, Inc., issued Apr. 29, 2003, both of which are incorporated by reference herein in their entireties. However, these methods reduce in-plane mechanical properties and result in significant increases in fiber preforming costs.

What is needed is a method of manufacturing CMC turbine engine components using a slurry cast MI process that increases interlaminar strength without substantially reducing in in-plane mechanical properties.

SUMMARY OF THE INVENTION

One embodiment of the present invention is a method of manufacturing a turbine engine component comprising the step of providing a plurality of ceramic plies, each ply comprising woven ceramic fiber tows and a plurality of oxidizable fugitive fiber tows. The method further comprises the step of laying up the plurality of plies in a preselected arrangement to form a turbine engine component shape. The method further comprises the step of inserting a plurality of tows of oxidizable fugitive fibers into the component shape, such that each fugitive fiber tow passes through a preselected number of ceramic plies. The method further comprises the step of burning off the fugitive fiber tows, the burning producing through-thickness void regions. The method further comprises the step of rigidizing the component shape with a layer of BN and a layer of SiC to form a coated component preform using chemical vapor infiltration and partially densifying the coated component preform using carbon-containing slurry and filling the through thickness void regions. The method further comprises the step of further densifying the coated component preform with at least silicon to form a ceramic matrix composite turbine engine component with in-situ ceramic matrix plugs formed where the through-thickness void regions were located.

Other embodiments of the present invention also include a ceramic matrix composite turbine engine component, such as a cooled turbine blade, an uncooled turbine blade, a cooled turbine nozzle, an uncooled turbine nozzle, a cooled turbine shroud, or an uncooled turbine shroud, wherein the component is manufactured with the method of the present invention as set forth above.

An advantage of the present invention is that the use of through thickness matrix plugs can improve through thickness strength with limited reduction of in-plane properties.

Another advantage of the present invention is that the use of through thickness matrix plugs allows the through-thickness strength of the CMC composite to be tailored, since the through-thickness matrix plugs may be selectively placed into preselected regions of the CMC composite in-situ.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
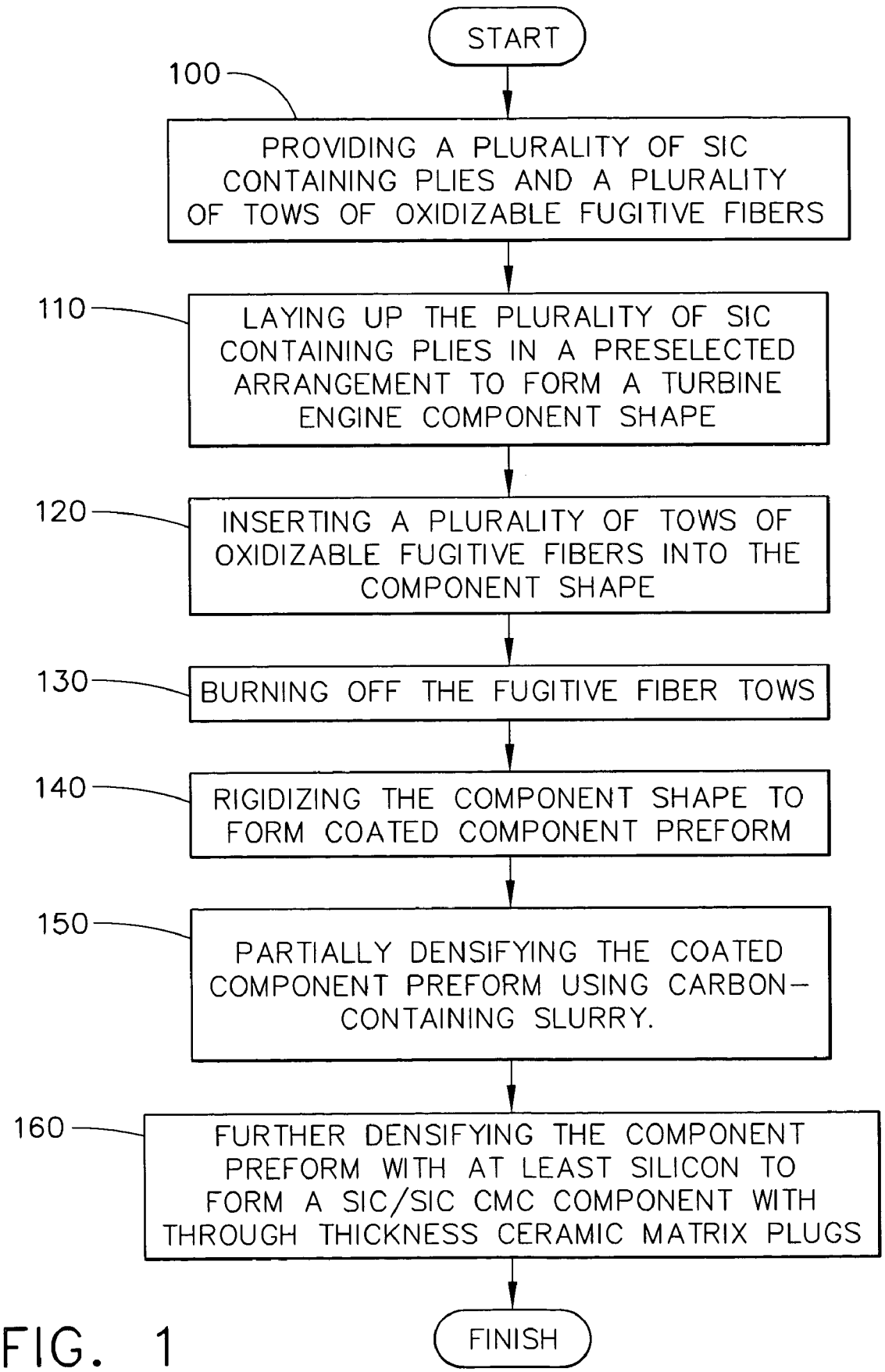
FIG. 1 is a flow chart illustrating a slurry cast MI method of manufacture of the present invention to produce a CMC turbine engine component with through thickness matrix plugs.
Figure 2:
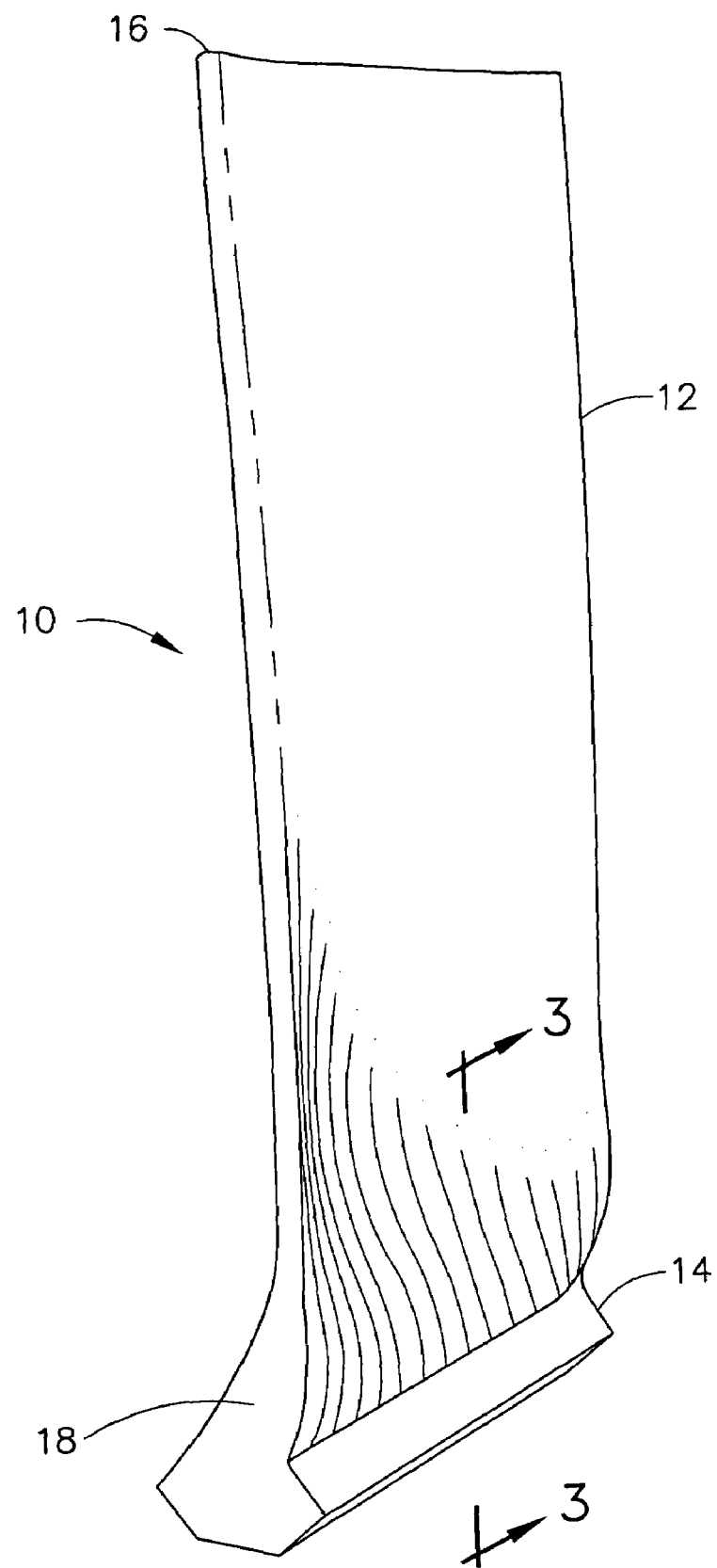
FIG. 2 is an exemplary example of a low pressure turbine (LPT) blade of a gas turbine engine.
Figure 7:
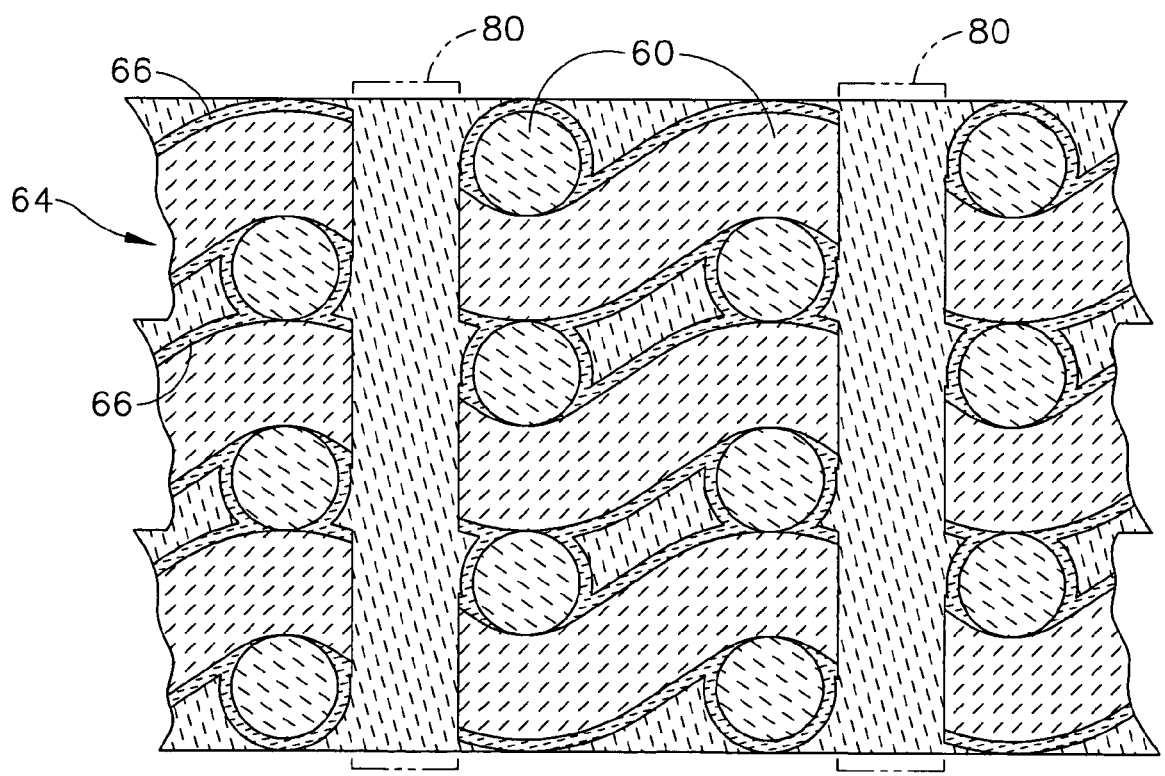
FIG. 7 is a cross-sectional view of a CMC LPT blade dovetail of FIG. 3 and FIG. 6 manufactured using the method of the present invention and showing the outermost plies of the dovetail.
Figure 6:
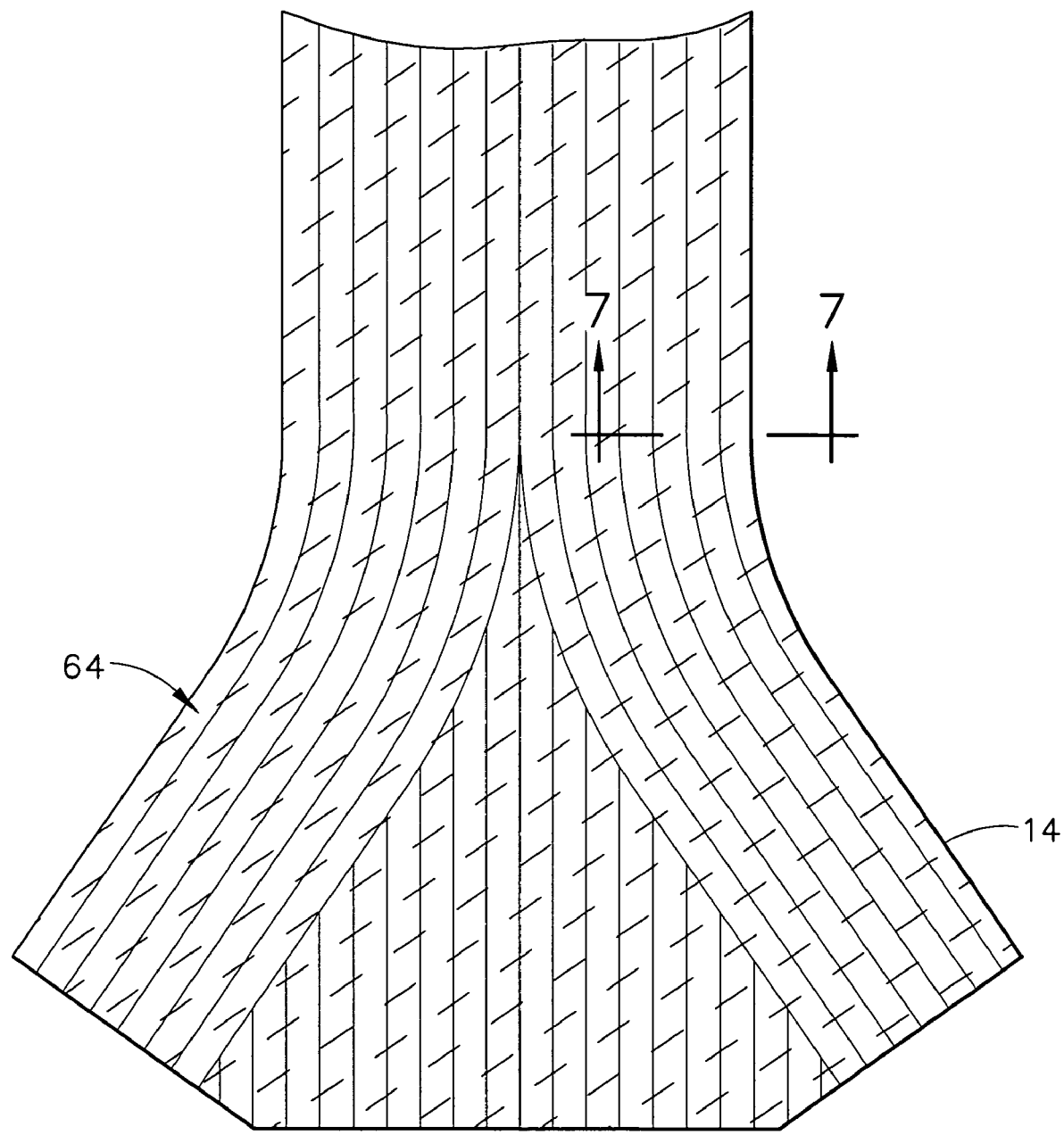
FIG. 6 is a cross-sectional view of a CMC LPT blade dovetail of the present invention manufactured using the method of the present invention.

As shown in FIG. 1, the present invention is a method for manufacturing a silicon carbide fiber-reinforced ceramic matrix composite article having through thickness matrix plugs comprising a series of steps. FIG. 2 depicts an exemplary ceramic matrix composite aircraft engine LPT blade 10 manufactured by the method of the present invention. In this illustration, an LPT blade 10 comprises a ceramic matrix composite material. The LPT blade 10 includes an airfoil 12 against which the flow of hot exhaust gas is directed. The LTP blade 10 is mounted to a turbine disk (not shown) by a dovetail 14 that extends downwardly from the airfoil 12 and engages a slot of similar geometry on the turbine disk. In one embodiment, the LPT blade 10 of the present invention includes an integral platform (not shown) between the dovetail 14 and the airfoil 12. A platform, which is not an important aspect of the method of the present invention, is provided to minimize the exposure of the dovetail 14 to hot gases of combustion. In another embodiment, the LPT blade 10 of the present invention does not include an integral platform, as shown in FIG. 2. A separate platform is provided between the dovetail 14 and the airfoil 12 to minimize the exposure of the dovetail 14 to hot gases of combustion. The airfoil 12 may be described as having a root end 18 and an oppositely disposed tip end 16. FIG. 6 and FIG. 7 shows a cross-sectional view of the CMC LPT blade dovetail 14 of the present invention manufactured with the slurry cast MI process. The LPT blade 10 comprises a plurality of balanced and/or biased ceramic slurry cast plies 64 within an interstitial ceramic matrix 68.

Figure 3:
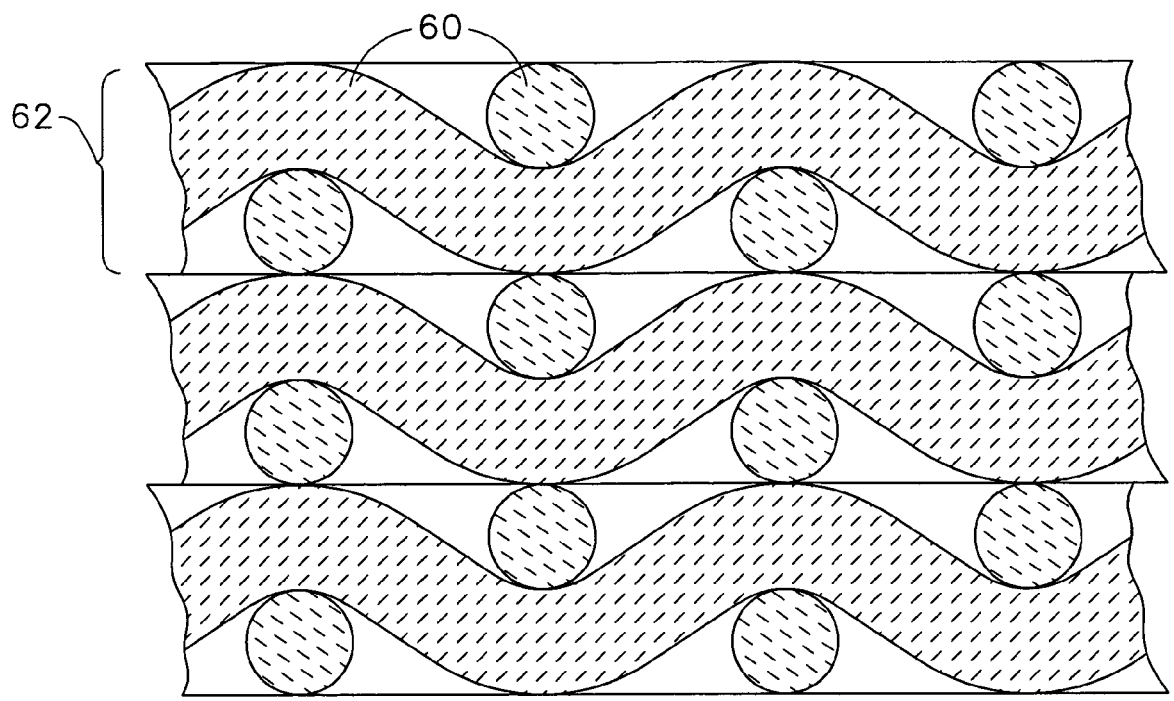
FIG. 3 is a cross-sectional view of the outermost laid up plies of the CMC LPT blade dovetail shape prior to the insertion of a plurality of tows of oxidizable fugitive fibers.

The initial step 100 of an embodiment of the process provides a plurality of silicon carbide containing cloth plies of a preselected geometry and a plurality of tows of fugitive fiber tows. Each cloth ply includes unidirectional or bi-directional fibers running in preselected directions or angles. The next step 110 of the process is laying up a preselected number of silicon carbide containing cloth plies of preselected geometry in a preselected arrangement to form a turbine engine component shape. The plies may be laid up and oriented in any manner known in the art. The top layers of one embodiment of the component shape, namely an LPT blade 10 dovetail 14, are shown in FIG. 3, which is a cross-sectional view of outermost laid up plies 62 of a silicon carbide LPT blade shape (shown in final form in FIG. 7), showing the individual silicon carbide ceramic containing cloth plies 62 having the silicon carbide ceramic containing tows 60 extending substantially within the plane of each ply.

"Fugitive fibers" refer to fibers of any material that are capable of being oxidized while leaving little to no charring or residue. It will be appreciated that a "tow," as used herein refers to a single fiber or to a loose strand of twisted or untwisted fibers that can be woven into a fiber bundle in the same manner as a single fiber. The fiber bundle acts substantially in the same manner as a single fiber.

Figure 4:
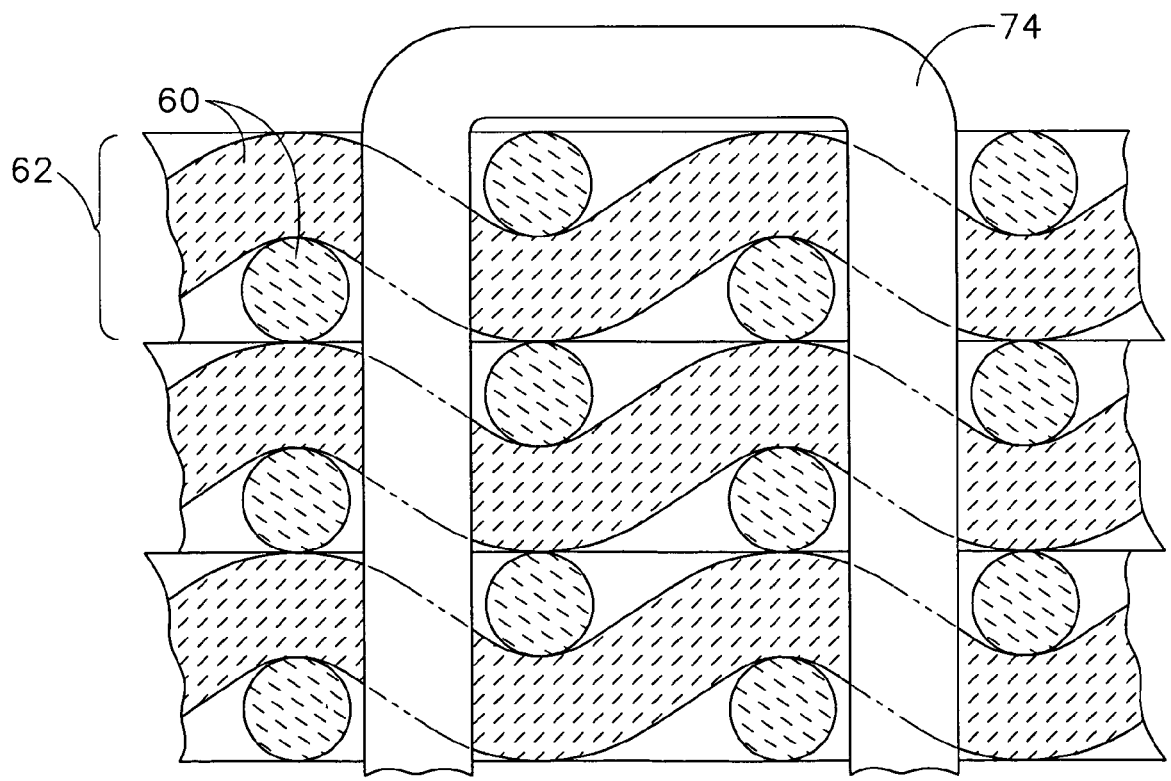
FIG. 4 is a cross-sectional view of the outermost laid up plies of the CMC LPT blade dovetail shape subsequent to the insertion of a plurality of tows of oxidizable fugitive fibers into the component shape, showing the displaced tows.

Once the plies are laid up, the next step 120 is inserting the plurality of fugitive fibers tows into the component shape in a preselected region or regions of the shape. Such an insertion may be performed with T-forming, Z-pinning, stitching, or combinations thereof. Preferably, the insertions are placed at preselected locations where it has been determined that interlaminar stresses are high, or where interlaminar separation has been observed. The insertion may be performed by hand or by machine. The material comprising the fugitive fiber tows may be any material that is oxidizable at a temperature higher than about 50° C., but lower than about 1000° C., provided that the products of the oxidation of the fugitive fiber tows do not adversely impact the properties of the final CMC component. In a preferred embodiment, the material comprising the fugitive fiber tows are an organic material, preferably selected from the group consisting of cotton, rayon, nylon, and combinations thereof. The fugitive fiber tows may extend partially through the laid-up shape, extending through at least two adjacent plies, or may extend through the entire thickness of the shape. Optionally, the fugitive fiber tows may be inserted throughout the entire shape rather than just through a preselected location or regions of the shape. The top layers of one embodiment of the component shape after the insertion of fugitive fiber tows, again an LPT shape 10 dovetail 14, are shown in FIG. 4, which is a cross-sectional view of outermost laid up plies 62 of a silicon carbide LPT shape (shown in final form in FIG. 7), showing the individual silicon carbide ceramic containing tows 60 and individual silicon carbide ceramic containing cloth plies 62. An individual fugitive fiber tow 74 is shown passing through the plies 62. This insertion displaces some of the individual fiber tows 60.

Figure 5:
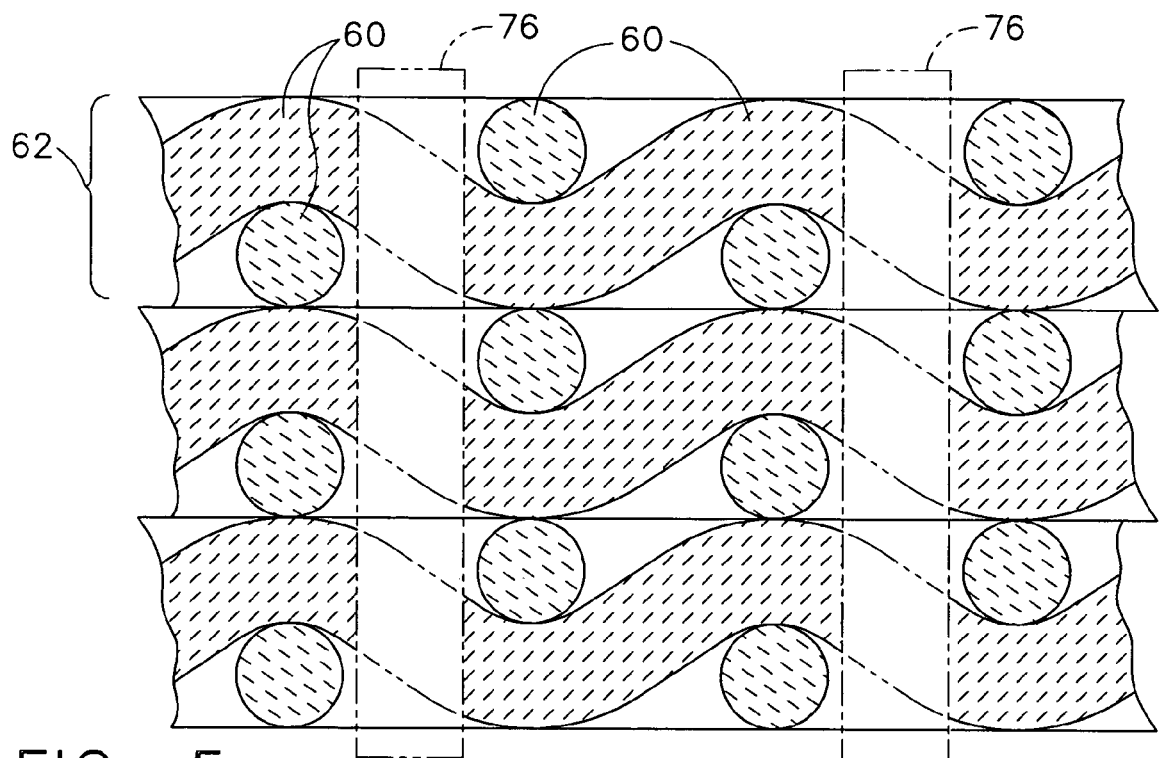
FIG. 5 is a cross-sectional view of the outermost laid up plies of the CMC LPT blade dovetail shape subsequent to the burning off of a plurality of tows of oxidizable fugitive fibers showing the original location of the oxidizable fugitive fibers in phantom.

The next step 130 of an embodiment of the present invention entails burning off the fugitive fiber tows by heating the component shape in an oxygen-containing atmosphere to a temperature in the range of about 50° C. to about 1000° C. for a preselected period of time sufficient to fully combust the fugitive fiber tows. In a preferred embodiment, this preselected period of time will be in the range of about 1 hour to about 100 hours. In a more preferred embodiment, the fugitive fiber tows are burned off at a temperature in the range of about 400° C. to about 800° C. for a preselected time in the range of about 2 hours to about 10 hours. The top layers of one embodiment of the component shape after the burning off of the fugitive fiber tows, again an LPT blade 20 dovetail 32, are shown in FIG. 5, which is a cross-sectional view of outermost laid up plies 62 of a silicon carbide LPT blade shape (shown in final form in FIG. 7), showing the individual silicon carbide ceramic containing tows 60 and individual silicon carbide ceramic containing cloth plies 62. Burned out regions 76, which previously contained a fugitive fiber tow 74 are shown in phantom. The portions 78 of the silicon carbide ceramic containing tows 60, which were displaced by the fugitive fiber tows are also shown in phantom.

The next step 140 is rigidizing the turbine blade shape by applying at least one of BN and SiC coatings using a chemical vapor infiltration (CVI) process as is known in the art, forming a rigid coated turbine blade preform. Such rigidizing is well known in the art.

The next step 150 is partially densifying the coated turbine blade preform by introducing a carbon-containing slurry, as is known in the art, into the porosity of the coated turbine blade preform, including the porosity of the previously burned out regions 76. The final step 160 is further densifying the turbine blade preform with at least silicon, and preferably boron doped silicon, through an MI process, as known in the art, forming a SiC/SiC CMC turbine engine component, including through thickness matrix plugs formed within the previously burned out regions 76. A cross-sectional view of an exemplary CMC LPT blade dovetail manufactured with the method of the present invention is shown in FIG. 6. The top layers of one embodiment of the final CMC turbine engine component, again an LPT blade 20 dovetail 32, are shown in FIG. 7, which is a cross-sectional view of outermost laid up plies 62 of a silicon carbide LPT blade 10. FIG. 7 shows the individual silicon carbide ceramic containing tows 60 and coating 66 in a silicon carbide containing matrix 68. Burned out regions 76, which previously contained a fugitive fiber tow 74 now contain through thickness ceramic matrix plugs 80, which are unitary with the rest of the silicon carbide containing matrix 68.

The through-thickness volume fraction of the through thickness matrix plugs is preferably in the range of about 1 percent to about 10 percent. In a preferred embodiment, the through thickness volume fraction of the through thickness matrix plugs is in the range of about 2 percent to about 5 percent.

The present invention also includes a ceramic matrix composite turbine engine component, such as a cooled turbine blade, an uncooled turbine blade, a cooled turbine nozzle, an uncooled turbine nozzle, a cooled turbine shroud, or an uncooled turbine shroud, wherein the component is manufactured with the method of the present invention as set forth above.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims

What is claimed is:

1. A method of manufacturing a turbine engine component comprising the steps of:
    providing a plurality of ceramic plies, each ply comprising woven ceramic fiber tows;
    providing a plurality of fugitive fibers tows;
    laying up the plurality of plies in a preselected arrangement to form a turbine engine component shape;
    inserting a plurality of tows of oxidizable fugitive fibers into the component shape, such that the fugitive fiber tows pass through at least two ceramic plies;
    burning off the fugitive fiber tows, the burning producing through-thickness void regions;
    rigidizing the component shape with a layer of BN and a layer of SiC to form a coated component preform using chemical vapor infiltration;
    partially densifying the coated component preform using carbon-containing slurry, filling the through-thickness void regions with carbon-containing slurry; and
    further densifying the coated component preform with at least silicon to form a ceramic matrix composite turbine engine component with in-situ ceramic matrix plugs formed where the through-thickness void regions were located.

2. The method of claim 1, wherein the ceramic fiber tows comprise silicon-carbide containing fibers.

3. The method of claim 1, wherein the plurality of tows are inserted using a method selected from the group consisting of T-forming, Z-pinning, stitching, and combinations thereof.

4. The method of claim 3, wherein the plurality of fugitive tows are inserted using Z-pinning.

5. The method of claim 3, wherein the plurality of fugitive tows are inserted using T-forming.

6. The method of claim 3, wherein the plurality of fugitive fiber tows are inserted using stitching.

7. The method of claim 3, wherein the insertion is performed by hand.

8. The method of claim 3, wherein the insertion is performed by machine.

9. The method of claim 1, wherein the step of burning is performed in an oxygen-containing atmosphere at a temperature in the range of about 50° C. to about 1000° C., for a period of time in the range of about 1 hour to about 100 hours.

10. The method of claim 1, wherein the fugitive fibers are selected from the group consisting of cotton, rayon, nylon, and combinations thereof.

11. The method of claim 1, wherein the plies are silicon carbide containing plies selected from the group consisting of balanced plies, biased plies, and combinations thereof.

12. The method of claim 1, wherein the turbine engine component is a turbine blade.

13. The method of claim 1, wherein the turbine engine component is an uncooled turbine blade.

14. The method of claim 1, wherein the turbine engine component is a cooled turbine blade.

15. The method of claim 1, wherein the turbine engine component is a cooled turbine nozzle.

16. The method of claim 1, wherein the turbine engine component is an uncooled turbine nozzle.

17. The method of claim 1, wherein the step of burning is performed in an oxygen-containing atmosphere at a temperature in the range of about 400° C. to about 800° C., for a period of time in the range of about 2 hours to about 10 hours.

18. A ceramic matrix composite turbine engine component manufactured using the process of claim 1.

19. The ceramic matrix composite turbine engine of claim 1, wherein the component is a cooled turbine shroud.

20. The ceramic matrix composite of claim 1, wherein the component is an uncooled turbine shroud.

\* \* \* \* \*